United States Patent
Swann et al.

[11] Patent Number: 6,149,192
[45] Date of Patent: Nov. 21, 2000

[54] INFLATOR HAVING GAS DEFLECTOR FLANGES

[75] Inventors: Timothy A. Swann, Mesa, Ariz.; Paul A. Bowers, Ray, Mich.

[73] Assignees: TRW Inc.; TRW Vehicle Safety Systems Inc., both of Lyndhurst, Ohio

[21] Appl. No.: 09/132,341

[22] Filed: Aug. 11, 1998

[51] Int. Cl.⁷ .................................................. B60R 21/28
[52] U.S. Cl. ........................................... 280/740; 280/742
[58] Field of Search .................................. 280/736, 741, 280/742, 740

[56] References Cited

U.S. PATENT DOCUMENTS

| | | | |
|---|---|---|---|
| 3,602,526 | 8/1971 | Brawn | 280/740 |
| 4,068,862 | 1/1978 | Ishi et al. | 280/740 |
| 4,178,017 | 12/1979 | Ishi et al. | 280/740 |
| 4,830,401 | 5/1989 | Honda . | |
| 4,902,036 | 2/1990 | Zander et al. . | |
| 5,018,762 | 5/1991 | Suzuki et al. . | |
| 5,246,249 | 9/1993 | Satoh . | |
| 5,378,011 | 1/1995 | Rogerson et al. . | |
| 5,387,007 | 2/1995 | Ogawa et al. | 280/740 |
| 5,836,608 | 11/1998 | Soderquist et al. | 280/740 |
| 5,918,902 | 7/1999 | Acker et al. | 280/742 |

FOREIGN PATENT DOCUMENTS 3604843  8/1987  Germany .

*Primary Examiner*—Lanna Mai
*Assistant Examiner*—Lynda Jasmin
*Attorney, Agent, or Firm*—Tarolli, Sundheim, Covell, Tummino & Szabo L.L.P.

[57] ABSTRACT

An apparatus (10) comprises an inflatable vehicle occupant protection device (12) and an actuatable inflator (14) for, when actuated, providing inflation fluid to inflate the inflatable vehicle occupant protection device. The inflator (14) includes a circumferentially spaced plurality of radially extending outlet openings (26) and a circumferentially spaced plurality of deflector flanges (30). The deflector flanges (30) are spaced radially from the outlet openings (26) and are radially aligned with the outlet openings. The deflector flanges (30) completely overlie the outlet openings (26). When the inflator (14) is actuated, the deflector flanges (30) deflect the inflation fluid flowing from the outlet openings (26) and thereby prevent the inflation fluid from impinging directly the inflatable vehicle occupant protection device (12) as the inflation fluid is being directed out of the inflator (14).

13 Claims, 4 Drawing Sheets

INFLATOR HAVING GAS DEFLECTOR FLANGES

TECHNICAL FIELD

The present invention relates to a vehicle safety apparatus comprising an inflatable vehicle occupant protection device, such as an air bag, and an inflator for inflating the inflatable vehicle occupant protection device.

BACKGROUND OF THE INVENTION

An air bag module for use in a vehicle typically includes an inflatable air bag and an actuatable inflator for, when actuated, providing inflation fluid to inflate the air bag. The inflator typically includes a source of inflation fluid, such as a pyrotechnic material, contained within a cylindrical housing. The inflation fluid flows out of the inflator through a plurality of outlet openings in the housing. The inflation fluid provided by the inflator may contain high temperature gases and particulate matter which may cause damage to the material of the air bag. Hence, it is desirable to prevent the inflation fluid from impinging directly on the air bag immediately after the inflation fluid exits the inflator through the outlet openings.

SUMMARY OF THE INVENTION

The present invention is an apparatus for use in a vehicle. The apparatus comprises an inflatable vehicle occupant protection device having inner and outer surfaces, and an actuatable inflator for, when actuated, providing inflation fluid to inflate the inflatable vehicle occupant protection device. The inflator includes a circumferentially spaced plurality of radially extending outlet openings which are located inside the inflatable vehicle occupant protection device. Inflation fluid from the inflator is directed radially outward through the outlet openings to inflate the inflatable vehicle occupant protection device. The inflator further includes a circumferentially spaced plurality of deflector flanges. The deflector flanges are spaced radially from the outlet openings and are radially aligned with the outlet openings. The deflector flanges completely overlie the outlet openings. When the inflator is actuated, the deflector flanges deflect the inflation fluid flowing from the outlet openings and thereby prevent the inflation fluid from impinging directly the inflatable vehicle occupant protection device as the inflation fluid is being directed out of the inflator.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
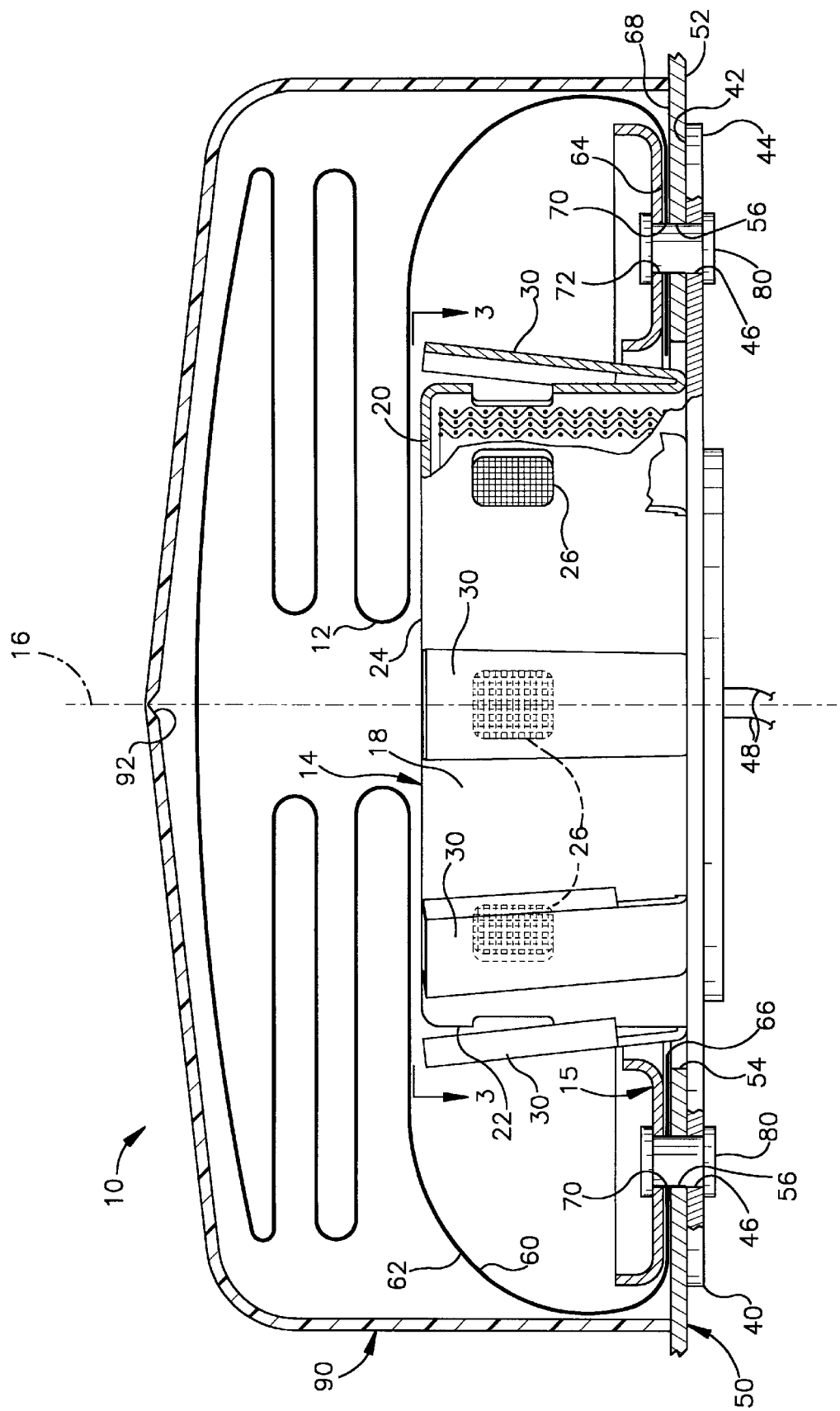
FIG. 1 is a schematic view, partially in section, of an air bag module constructed in accordance with the present invention.

The present invention relates to a vehicle safety apparatus including an inflatable vehicle occupant protection device for helping to protect a vehicle occupant in the event of a vehicle collision. The present invention is applicable to various vehicle safety apparatus constructions. As representative of the present invention, FIG. 1 illustrates a vehicle safety apparatus or air bag module 10. The air bag module 10 includes an inflatable vehicle occupant protection device or air bag 12 and an inflator 14.

The inflator 14 is illustrated as a driver-side inflator and comprises a source of inflation fluid for inflating the air bag 12. As is known in the art, the inflator 14 contains an ignitable gas generating material which, when ignited, rapidly produces a volume of gas to inflate the air bag 12. Alternatively, the inflator 14 could contain a stored quantity of pressurized inflation fluid, or could contain a combination of pressurized inflation fluid and ignitable material for heating the pressurized inflation fluid.

The inflator 14 has a central axis 16 and includes a cylindrical enclosure member or housing 20. The housing 20 is preferably a stamped metal part having a cylindrical outer surface 22 extending parallel to the central axis 16 and a radially extending end surface 24 located at an upper (as viewed in FIG. 1) end of the inflator. A circumferentially spaced plurality of outlet openings 26 are formed in the housing 20 for directing inflation fluid out of the inflator 14 toward the air bag 12. In accordance with a first embodiment of the present invention, the outlet openings 26 are identical in size and are spaced equally apart.

The inflator 14 further includes a circumferentially spaced plurality of deflector flanges 30 formed in one piece with the stamped metal housing 20. The deflector flanges 30 project generally axially from a lower (as viewed in FIG. 1) end of the inflator 14 toward the upper end at which the end surface 24 is located.

Figure 2:
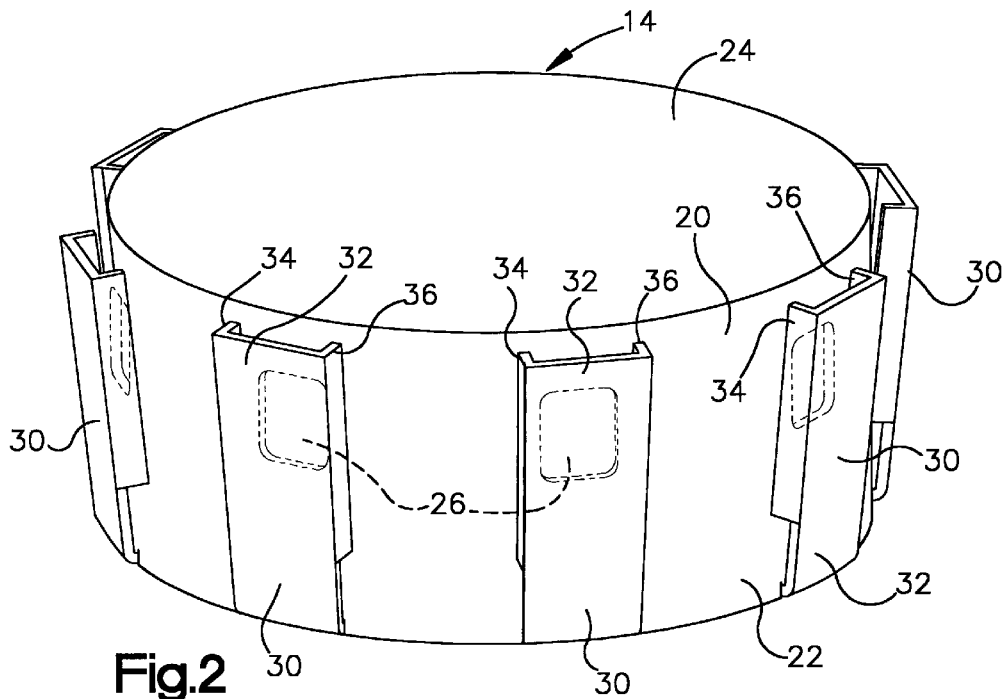
FIG. 2 is a perspective view of a component of the air bag module of FIG. 1.
Figure 3:
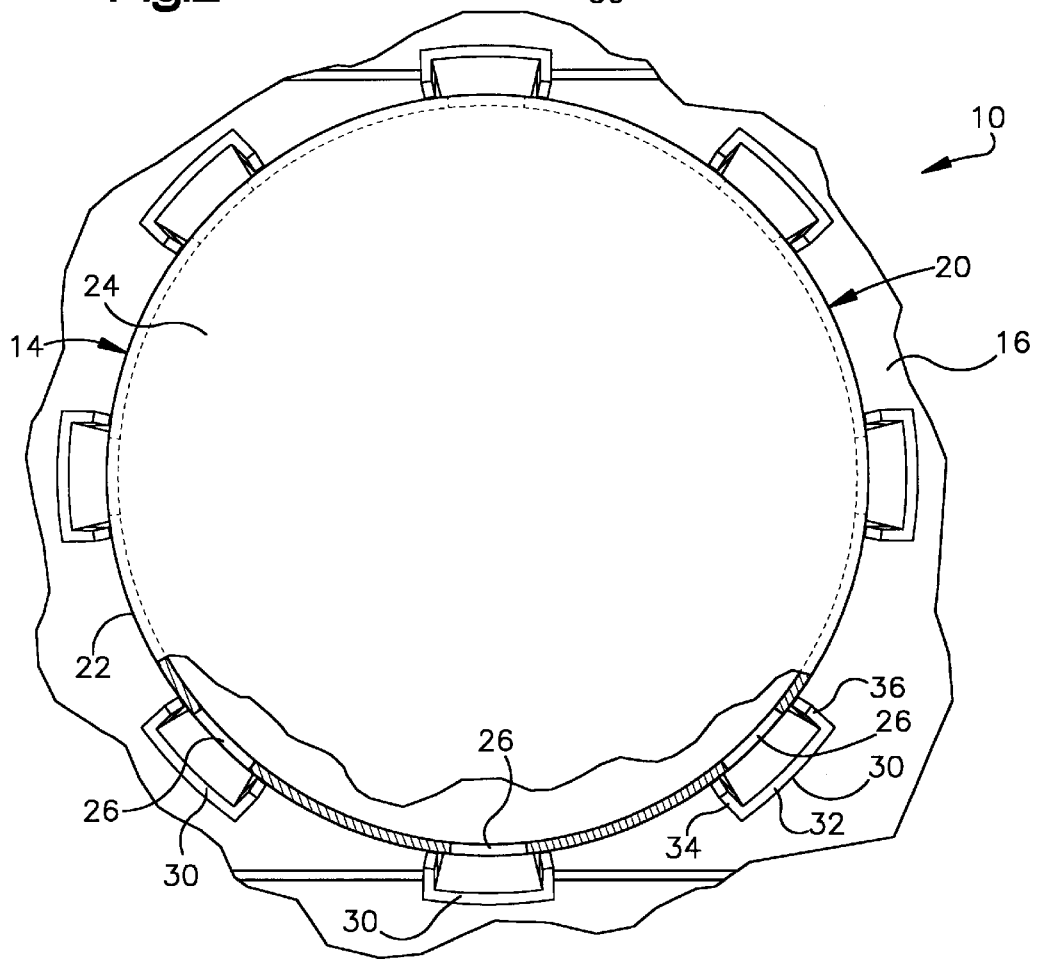
FIG. 3 is a top view taken along line 3—3 in FIG. 1.
Figure 4:
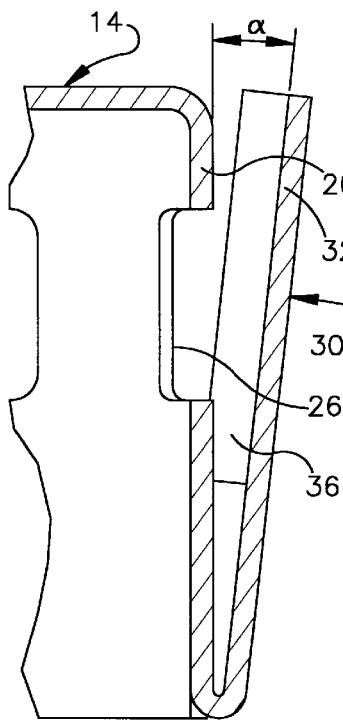
FIG. 4 is an enlarged view of a portion of the air bag module of FIG. 1.

The deflector flanges 30 diverge, as they extend from the lower end of the inflator 14 toward the upper end of the inflator, at a slight angle a (FIG. 4) relative to the cylindrical outer surface 22 of the housing 20. Each of the deflector flanges 30 has a base panel 32 and first and second side panels 34 and 36, respectively (FIGS. 2 and 3). The first and second side panels 34 and 36 extend parallel to each other and perpendicular to the base panel 32. The side panels 34, 36 extend only partially along the length of the base panel 32 as best seen in FIG. 4.

Each of the deflector flanges 30 is radially aligned with a respective one of the outlet openings 26. The base panel 32 of each deflector flange 30 completely overlies, but is spaced from, a respective one of the outlet openings 26. The first and second side panels 34 and 36 extend from the base panel 32 of each deflector flange 30 toward a respective portion of the outer surface 22 of the housing 20 surrounding each outlet opening 26. Preferably, the side panels 34, 36 of the deflector flanges 30 do not contact the outer surface 22 of the housing 20. It is contemplated, however, that the side panels 34, 36 of the deflector flanges 30 could extend the entire length of the base panel 43 and project from the cylindrical outer surface 22 of the housing 20.

A mounting flange 40 projects radially outward from a lower (as viewed in FIG. 1) end of the inflator 14. The mounting flange 40 has parallel upper and lower surfaces 42 and 44, respectively, and a circumferentially spaced plurality of fastener openings 46. A pair of lead wires 48 extend from the lower end of the inflator 14 and are electrically coupled with vehicle circuitry (not shown) for actuating the inflator, as known in the art.

The upper surface 42 of the mounting flange 40 of the inflator 14 abuts a lower surface 52 of a mounting plate 50 attached to the vehicle steering wheel in a manner not shown. The mounting plate 50 has a central opening 54 for receiving the inflator 14. A circumferentially spaced plurality of fastener holes 56 are formed in the mounting plate 50. Each fastener hole 56 aligns with a respective one of the plurality of fastener openings 46 in the mounting flange 40 of the inflator 14.

The air bag 12 (illustrated schematically by a single line in FIG. 1) is made from panels of a fabric material, such as woven nylon. The air bag 20 has inner and outer surfaces 60 and 62, respectively. A mouth portion 64 of the air bag 12 adjoins the mounting plate 50. The mouth portion 64 includes a central opening 66 through which the housing 20 of the inflator 14 extends. The outer surface 62 in the mouth portion 64 of the air bag 12 abuts an upper surface 68 of the mounting plate 50. A circumferentially spaced plurality of clearance holes 70 are located in the mouth portion 64 of the air bag 12. Each of the clearance holes 70 aligns with a respective one of the fastener openings 46 in the mounting flange 40 of the inflator 12 and with a respective one of the fastener holes 56 in the mounting plate 50.

The air bag module includes a retaining ring 15 for retaining the air bag 12. The retaining ring 15 is generally circular in shape and circumscribes the inflator 14. The retaining ring 15 is made of metal and has a U-shaped cross-section. The retaining ring 15 overlies the mouth portion 64 of the air bag 12 and includes a circumferentially spaced plurality of fastener apertures 72. The fastener apertures 72 are located so as to align with the clearance holes 70 in the air bag 12, the fastener openings 46 in the mounting flange 40 of the inflator 14, and the fastener holes 56 in the mounting plate 50.

A plurality of fasteners 80, illustrated as rivets in FIG. 1, extend axially through the aligned holes/openings 72, 70, 56 and 46 in the retaining ring 15, the air bag 12, the mounting plate 50, and the inflator mounting flange 40, respectively. The fasteners 80 clamp the mouth portion 64 of the air bag 12 between the retaining ring 15 and the mounting plate 50 to secure the air bag 12 in the air bag module 10. It should be understood that fasteners 80 could be any known type of fasteners such as bolts, studs, or screws.

The air bag module 10 further includes a cover 90 which covers the folded air bag 12 and the inflator 14. The cover 90 is secured to the mounting plate 50 in a manner not shown. The cover 90 has a tear seam 92 at which the cover will tear to allow the air bag 12 to deploy after actuation of the inflator 14.

In the event of sudden vehicle deceleration such as occurs in a vehicle collision, the inflator 14 is actuated in a known manner to produce and release inflation fluid in the form of gas to inflate the air bag 12. Depending on the design of the inflator 14, the gas produced by the inflator may exit the inflator at a relatively high temperature. Further, the gas may contain particulate matter resulting from the combustion of pyrotechnic materials inside the inflator 14. Such particulate matter carried by the gas may also exit the inflator 14 at a relatively high temperature.

The gas produced by the actuated inflator 14 is directed out of the inflator through the outlet openings 26. The gas thus leaves the inflator 14 flowing in a radially outward direction through the outlet openings 26. After the gas passes through the outlet openings 26, the gas impinges directly on the deflector flanges 30 located radially outward of the outlet openings.

The deflector flanges 30, which completely overlie the outlet openings 26, deflect the inflation gas which is flowing radially outward, causing the gas to flow along and around the deflector flanges and into the folded air bag 12 to inflate the air bag. The inflation of the air bag 12 causes the tear seam 94 in the cover to rupture under the force of the expanding air bag so that the air bag can fully deploy into the passenger compartment of the vehicle.

The configuration and location of the deflector flanges 30 over the outlet openings 26 prevents the inflation gas from impinging directly on the inner surface 60 of the air bag 12 as the gas exits the inflator 14. The flow of the gas into the deflector flanges 30 also reduces the velocity and temperature of the gas entering the air bag 12. Further, the flow of gas into the deflector flanges 30 provides an additional opportunity for particulate matter in the gas to precipitate out of the gas or plate out of the gas onto the deflector flanges prior to entry into the air bag.

Figure 5:
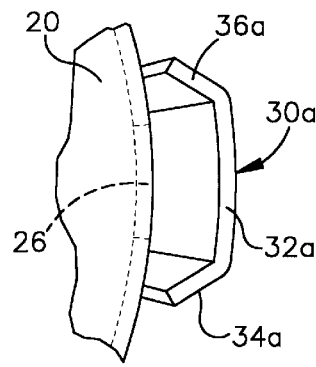
FIG. 5 is an enlarged top view of a portion of an air bag module constructed in accordance with second embodiment of the present invention.

FIG. 5 illustrates a second embodiment of the present invention in which the first and second side panels 34a and 36a of each of the deflector flanges 30a extend at diverging angles from the base panel 32a. This configuration helps to distribute the inflation gas impinging upon the deflector flanges 30a across a central portion of the air bag 12.

Figure 6:
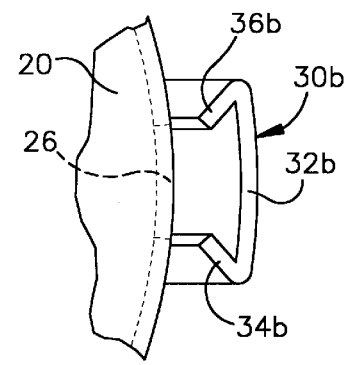
FIG. 6 is a view similar to FIG. 5 illustrating a third embodiment of the present invention.

FIG. 6 illustrates a third embodiment of the present invention in which the first and second side panels 34b and 36b of each of the deflector flanges 30b extend at converging angles from the base panel 32b. This configuration helps to control the flow path of the inflation gas impinging upon the deflector flanges 30b to minimize the amount of gas flowing radially around the deflector flanges and into the air bag 12.

Figure 7:
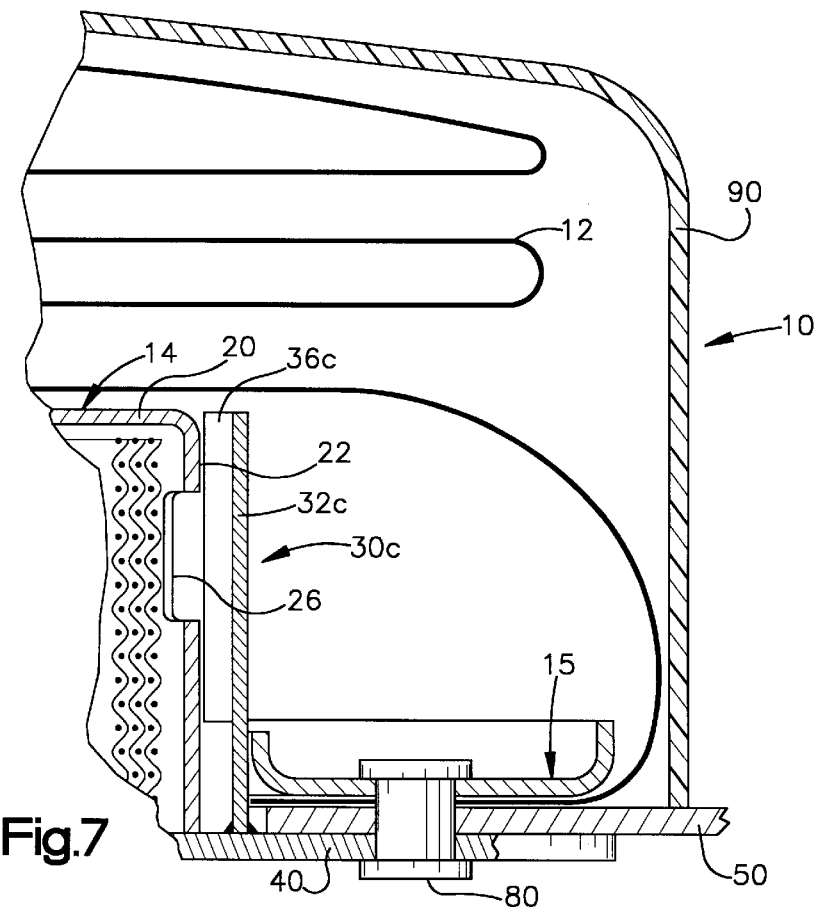
FIG. 7 is a schematic view, partially in section, of a portion of an air bag module constructed in accordance with a fourth embodiment of the present invention.

FIG. 7 illustrates a fourth embodiment of the present invention in which the deflector flanges 30c are welded to the mounting flange 40 of the inflator 14, rather than being formed in one piece with the housing 20 as described above. Also, FIG. 7 illustrates a further modification of the deflector flanges 30c in that the deflector flanges extend axially parallel to the cylindrical outer surface 22 of the housing 20. It should be understood that the axially extending deflector flanges 30c do not have to be welded to the mounting flange 40, but could instead be formed in one piece with the housing 20 in the stamping process of the housing.

Figure 8:
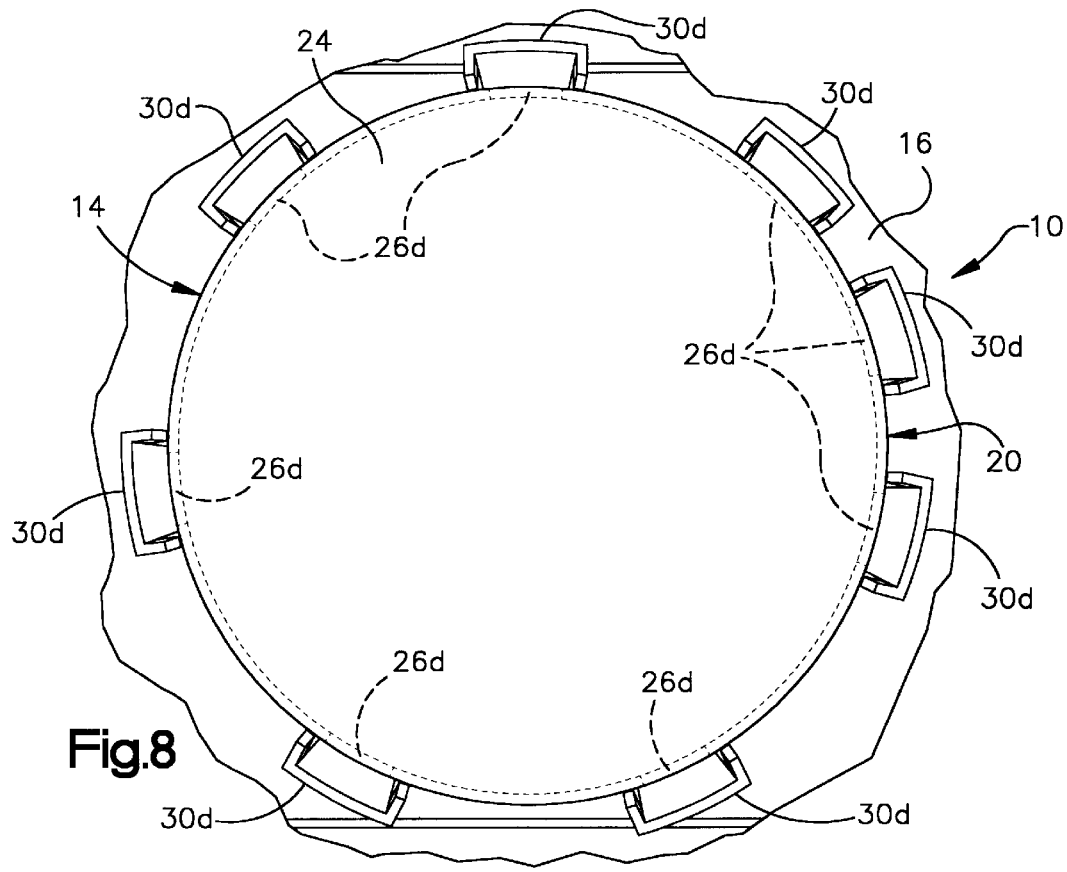
FIG. 8 is a view similar to FIG. 3 of an air bag module constructed in accordance with an fifth embodiment of the present invention.

FIG. 8 illustrates a fifth embodiment of the present invention in which a plurality of outlet openings 26d in the housing 20 and a corresponding plurality of deflector flanges 30d disposed radially outward of each outlet opening 26 are not equally spaced as with the first embodiment of FIGS. 1–4. Instead, in the fifth embodiment of FIG. 8, the outlet openings 26d and corresponding deflector flanges 30d are spaced unevenly about the circumference of the inflator 14. A majority of the outlet openings 26d and deflector flanges 30d are located on one half of the inflator 14 to direct a larger volume of the inflation fluid from the inflator into a given portion of the air bag 12.

Figure 9:
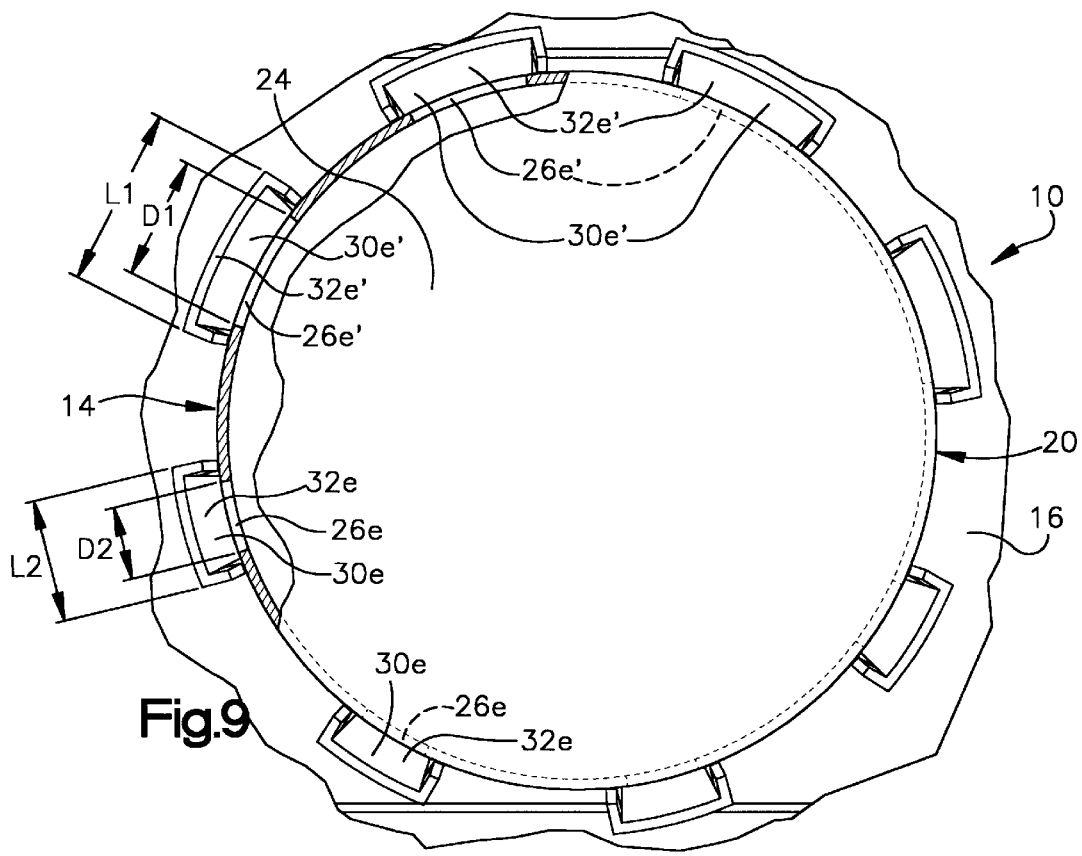
FIG. 9 is a view similar to FIG. 8 of an air bag module constructed in accordance with an sixth embodiment of the present invention.

FIG. 9 illustrates a sixth embodiment of the present invention in which a plurality of outlet openings 26e and corresponding deflector flanges 30e are not identical in size as with the embodiment of FIGS. 1–4. Instead, in the embodiment of FIG. 9, a portion 26e' of the outlet openings 26e located on one half of the inflator have a larger diameter D1, while another portion of the outlet openings 26e have a smaller diameter D2. The deflector flanges 30e' associated with the larger diameter outlet openings 26e' have a correspondingly larger base panel 32e' with a circumferential length L1. The deflector flanges 30e associated with the smaller diameter outlet openings 26e have a correspondingly smaller base panel 32e with a circumferential length L2, as may be seen in FIG. 9. This configuration of the outlet openings 26e and deflector flanges 30e functions in a manner similar to the embodiment of FIG. 8 in that it directs a larger volume of the gas flow into a given portion of the air bag 12.

From the above description of the invention, those skilled in the art will perceive improvements, changes and modifications. Such improvements, changes and modifications within the skill of the art are intended to be covered by the appended claims.

What is claimed is:

1. An apparatus for use in a vehicle, said apparatus comprising:
   an inflatable vehicle occupant protection device having inner and outer surfaces; and
   an actuatable inflator for, when actuated, providing inflation fluid to inflate said inflatable vehicle occupant protection device,
   said inflator including a circumferentially spaced plurality of radially extending outlet openings which are located inside said inflatable vehicle occupant protection device and through which inflation fluid from said inflator is directed radially outward to inflate said inflatable vehicle occupant protection device,
   said inflator further including a circumferentially spaced plurality of deflector flanges, said plurality of deflector flanges being permanently spaced radially from said plurality of outlet openings and being radially aligned with said outlet openings, said plurality of deflector flanges completely overlying said plurality of outlet openings such that, when said inflator is actuated, said deflector flanges deflect the inflation fluid flowing from said plurality of outlet openings and thereby prevent the inflation fluid from impinging directly on said inner surface of said inflatable vehicle occupant protection device as the inflation fluid is being directed out of said inflator;
   said inflator including a housing, said plurality of outlet openings being formed in said housing, said plurality of deflector flanges being formed in one piece with said housing.

2. The apparatus of claim 1 wherein each of said plurality of deflector flanges radially aligns with and completely overlaps a respective one of said plurality of outlet openings.

3. The apparatus of claim 1 wherein said inflator includes a housing having a cylindrical outer surface, said plurality of deflector flanges extending parallel to said cylindrical outer surface.

4. The apparatus of claim 1 wherein said inflator includes a housing having a cylindrical outer surface, said plurality of deflector flanges extending at an angle relative to said cylindrical outer surface.

5. The apparatus of claim 1 wherein said plurality of outlet openings and said plurality of deflector flanges are equally spaced about the circumference of said inflator.

6. The apparatus of claim 1 wherein said plurality of outlet openings and said plurality of deflector flanges are unequally spaced about the circumference of said inflator.

7. The apparatus of claim 1 wherein each of said plurality of outlet openings is identical in size.

8. The apparatus of claim 1 wherein said plurality of outlet openings includes diffuser openings of different sizes.

9. An apparatus for use in a vehicle, said apparatus comprising:
   an inflatable vehicle occupant protection device having inner and outer surfaces; and
   an actuatable inflator for, when actuated, providing inflation fluid to inflate said inflatable vehicle occupant protection device,
   said inflator including a circumferentially spaced plurality of radially extending outlet openings which are located inside said inflatable vehicle occupant protection device and through which inflation fluid from said inflator is directed radially outward to inflate said inflatable vehicle occupant protection device,
   said inflator further including a circumferentially spaced plurality of deflector flanges, said plurality of deflector flanges being spaced radially from said plurality of outlet openings and being radially aligned with said outlet openings, said plurality of deflector flanges completely overlying said plurality of outlet openings such that, when said inflator is actuated, said deflector flanges deflect the inflation fluid flowing from said plurality of outlet openings and thereby prevent the inflation fluid from impinging directly on said inner surface of said inflatable vehicle occupant protection device as the inflation fluid is being directed out of said inflator;
   at least one of said plurality of deflector flanges comprising a base panel and first and second side panels.

10. The apparatus of claim 9 wherein said first and second side panels extend perpendicular to said base panel toward a respective one of said plurality of outlet openings.

11. The apparatus of claim 9 wherein at least one of said first and second side panels extends at an angle from said base panel toward a respective one of said plurality of outlet openings.

12. The apparatus of claim 9 wherein said first and second side panels extend at converging angles from said base panel toward a respective one of said plurality of outlet openings.

13. The apparatus of claim 9 wherein said inflator includes a housing, said plurality of outlet openings being formed in said housing, said plurality of deflector flanges being welded to said housing.

\* \* \* \* \*